Figure 3:
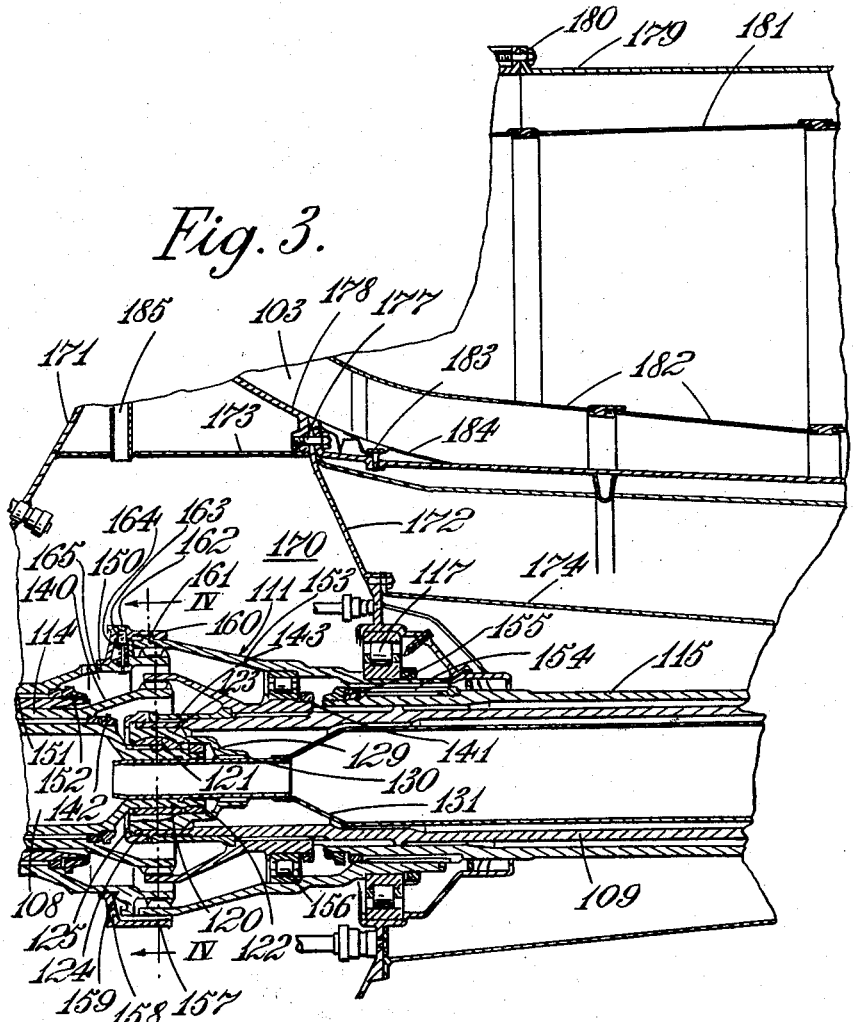

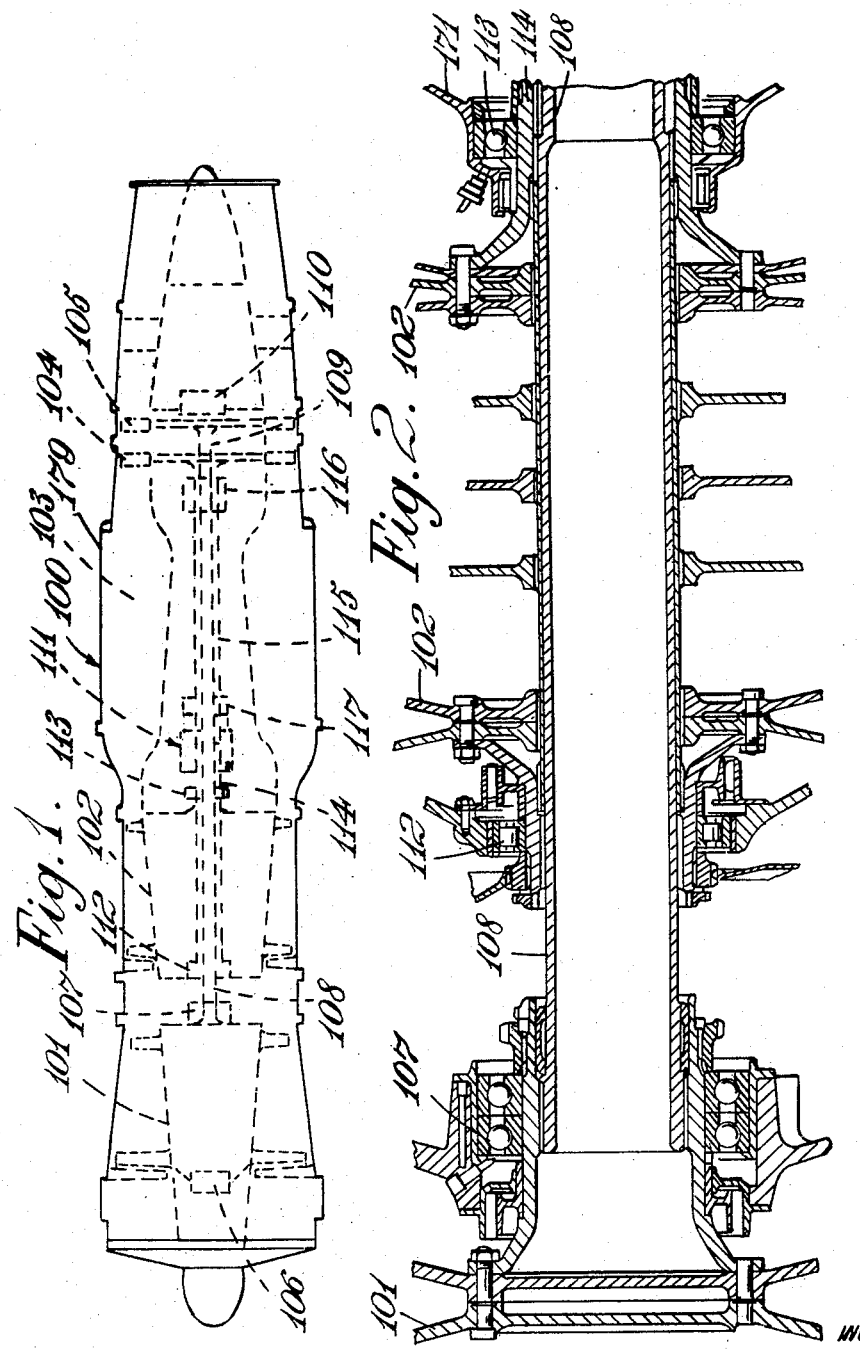

INVENTORS
F. C. I. MARCHANT &
J. E. BELL &
S. G. HOOKER
By Wilkinson & Mawhinney
ATTYS.

Dec. 7, 1954   F. C. I. MARCHANT ET AL   2,696,346
FLEXIBLE SHAFT COUPLING
Filed Feb. 1, 1952                3 Sheets-Sheet 3

INVENTORS
F. C. I. MARCHANT &
J. E. BELL &
S. G. HOOKER
By Wilkinson & Mawhinney
ATTYS.

United States Patent Office 2,696,346
Patented Dec. 7, 1954

2,696,346

FLEXIBLE SHAFT COUPLING

Francis Charles Ivor Marchant, Horfield, Bristol, John Ernest Bell, Mangotsfield, near Bristol, and Stanley George Hooker, Falfield, England, assignors to The Bristol Aeroplane Company Limited, Bristol, England, a British company Application February 1, 1952, Serial No. 269,423

Claims priority, application Great Britain May 4, 1951

6 Claims. (Cl. 230—116)

This invention relates to an improved form of coupling between shafts subject to slight misalignment and arranged in locations where the exterior of the coupling is not accessible for the purpose of connection and disconnection.

It is known that such conditions occur in the case of gas turbines of the kind comprising in axial sequence a low pressure compressor, a high pressure compressor, a combustion system, a high pressure turbine and a low pressure turbine so that the high pressure turbine drives the high pressure compressor and the low pressure turbine the low pressure compressor. In such an arrangement it is of course necessary for the shafting and coupling of the low pressure system to extend through and for the most part be enclosed in the high pressure system. In an engine of this kind the length of the combustion system makes the provision of at least three bearings for the compressor-turbine rotor system essential, while practical considerations of manufacture and differential expansion make it impossible to guarantee alignment of the bearings. It is recognized therefore that a coupling must be provided at the high pressure end of the compressor in a location where access is difficult owing to surrounding combustion equipment and structural members, and the object of this invention is to provide an improved form of coupling suitable for use in such locations.

The invention accordingly comprises a coupling between four shafts arranged in pairs, an inner shaft contained within an outer hollow shaft for each pair, and subject to slight misalignment one at least of said inner shafts being hollow, comprising internally and externally toothed parts fixed or formed on the two inner shafts respectively and in rotational driving engagement with one another while permitting slight angular misalignment, one of the adjacent inner shaft ends carrying a part-spherical surface mating in overlapping relation with a complementary part-spherical surface on a member attached to the other adjacent inner shaft end in a manner permitting rotation but not axial withdrawal in relation thereto, the parts carrying the mating surfaces being cut away sufficiently to allow these surfaces to be brought together axially and then locked against withdrawal by partial rotation of the rotatable member, means extending through the hollow inner shaft for effecting such partial rotation and for locking the rotatable member against undesired rotation relatively to the shafts and internally and externally toothed parts fixed or formed on the outer hollow shafts respectively and in rotational driving engagement with one another while permitting slight angular misalignment.

According to a feature of the invention means are provided for preventing axial separation of the outer toothed parts, such means preferably comprising a sleeve mounted on one of said parts and overlapping the second part so that it can be rotated but not axially moved towards the second part, projections being provided on said sleeve and second part to prevent their separation when the sleeve is in a certain angular relation thereto and to permit such separation when in another angular relation thereto, and releasable means being provided for locking the sleeve in said first angular relation.

Figure 6:
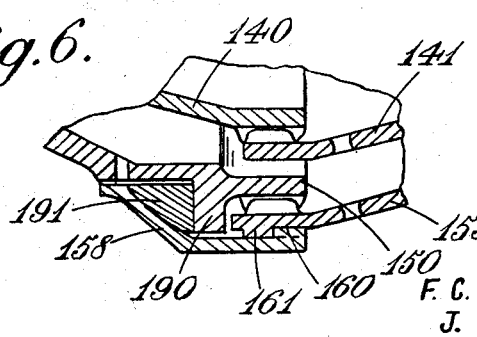
Figure 4:
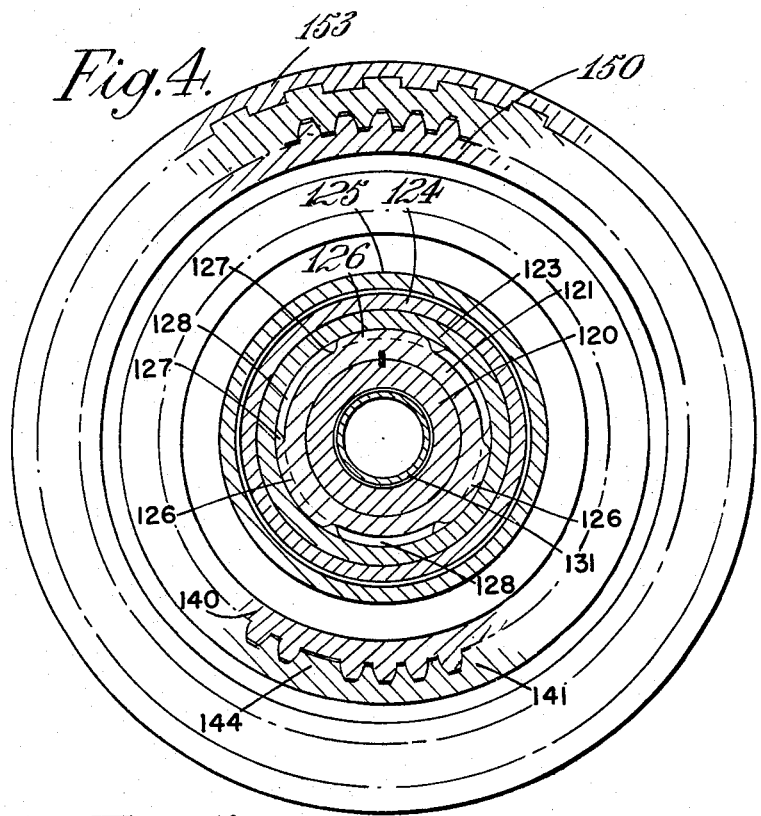
Figure 5:
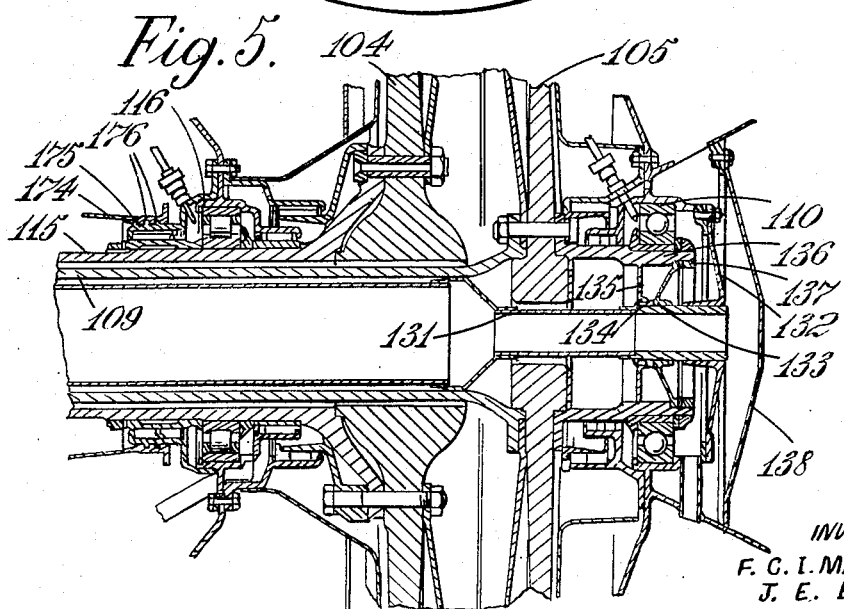

A practical embodiment of this invention will now be described, by way of example only, with reference to the accompanying drawings whereof:

Figure 1 is a diagrammatic side elevation of a compound gas turbine engine as above set forth and incorporating a coupling in accordance with this invention, Figure 2 is a sectional elevation of the compressor shafts of Figure 1 and to a larger size, Figure 3 is a sectional elevation of the coupling and of the turbine shafts shown in Figure 1 and to a larger size, Figure 4 is a section on the line IV—IV of Figure 3 and to a larger size, Figure 5 is a sectional elevation of the turbines and their shafts, and Figure 6 is a sectional elevation showing an alternative construction of a part of the coupling shown in Figure 2.

Referring to the drawings: the gas turbine engine which is generally indicated by the reference numeral 100 comprises a low pressure compressor 101 which discharges into a high pressure compressor 102 which in turn discharges air into an annular combustion chamber 103 where it is heated by the combustion of fuel and from which it is discharged in axial sequence through a high pressure turbine 104 and a low pressure turbine 105. The rotor of compressor 101 is supported in bearings 106 and 107 and comprises an assembly of blade-carrying discs mounted upon a hollow shaft 108. The low pressure turbine 105 associated with the compressor 101 comprises a rotor attached to the end of a hollow shaft 109. The rotor of turbine 105 is supported on its rear side by a bearing 110 and the shaft 109, which is supported in bearings as later described, extends through the combustion chamber 103, the shafts 108 and 109 being joined together by a coupling member generally indicated by the reference numeral 111. The compressor 102 is of similar construction to the compressor 101 and is supported by bearings 112 and 113, the rotor 102 being associated with a hollow shaft 114. The rotor of the turbine 104 is attached to the end of a hollow shaft 115 which is supported in bearings 116 and extends forwardly through the combustion chamber 103 to the coupling 111 where the shafts 114 and 115 are drivingly connected together as later described. The forward end of the shaft 115 (i. e. adjacent the coupling 111) is supported by a bearing 117. It is to be understood that the shafts 108 and 109 are respectively nested in the hollow shafts 114 and 115.

As shown in Figure 3 the shaft 109 extends into overlapping relation with a projection 120 of the compressor shaft 108 beyond bearing 113. The projection 120 in effect forms a spigot extending loosely into the open end of the turbine shaft 109 and the annular space between them is taken up by spherically surfaced coupling members, the convexly curved member 121 being keyed to projection 120 and being held thereon by a clamping nut 122 while the concavely curved member 123 is housed in a counter-bored part 124 of the turbine shaft 109 and prevented from moving towards the compressor by a retaining ring 125 screwed on to the end of the shaft 109. The spherically surfaced members 121, 123 are cut away in the manner of the well-known interrupted thread breech block so that they can be brought together axially and then locked against withdrawal by partial rotation of the member 123. Thus, as more clearly shown in Figure 8, the member 121 is formed with three equi-spaced convexly curved lobes 126 and the member 123 is formed with three equi-spaced concavely curved portions 127 which are angularly spaced apart to form spaces 128. The members 121 and 123 may be brought together axially the lobes 126 passing through the spaces 128 and the portions 127 entering the spaces between the lobes 126. The members 121 and 123 will then be locked against withdrawal by partial rotation of the member 121 to bring the lobes 126 into engagement with the portions 127 as shown in Figure 4.

The member 123 is provided with an extension 129 which is internally splined at 130 and engages a tubular member 131 extending through the turbine shaft 109 to beyond the bearing 110 (Figure 5). At this end the tubular member 131 is supported by a flanged member 132 and rigidly carries a disc 133 having splines 134 to engage corresponding splines on a diaphragm 135 forming part of the bearing assembly. The disc 133 is clamped to the bearing element 136 by the ring 137 which is threaded into the element 136.

The assembly described in the preceding paragraph is enclosed by a cover plate 138 which on removal enables the flanged member 132 to be removed whereby access is had to the clamping ring 137. When the latter is unscrewed the disc 133 may be drawn axially out of the element 136 whereby the splines 134 disengage the diaphragm 135. The disc 133 may then be turned to rotate the tubular member 131. The splined connection 130 is sufficiently long to maintain engagement between the members 123 and 131 after the disc 133 and the tubular member 131 which carry it have been moved axially to allow disengagement of the splines 134. When the disc 133 has disengaged diaphragm 135 it may be used to turn the tubular member 131 and hence the member 123 whereby the members 121 and 123 of the coupling 111 are engaged as described above. When the coupling has been engaged the tubular member 131 is moved axially back into position in which the splines 134 engage the corresponding splines on the diaphragm 135 whereby the tubular member 131 is locked in position. The tubular member 131 is retained in this position by the clamping ring 137.

For the transmission of torque between the shafts 108 and 109 each carries one part of a coupling of the type comprising short internally and externally toothed parts. Thus, the shaft 108 is in splined engagement with an externally toothed part 140 and similarly the shaft 109 is splined to receive an internally toothed part 141. The part 140 is held in position upon the splined shaft 108 by retaining ring 142 while the part 141 is held upon the splined shaft 109 by a spacing sleeve 143 which is in turn held in position upon the shaft by the retaining ring 125.

Such couplings permit a slight degree of misalignment and offer no obstacle to axial disengagement.

As shown in Figure 4 the teeth of the part 140 and 141 are all the same with the exception of one tooth, indicated in Figure 4 by the reference numeral 144. The provision of such a tooth provides that the coupling members are engageable only in one position corresponding with the position in which the members 121 and 123 may be engaged and the splined connection 130 is also formed in this way so as to guarantee that when the tubular member 131 is locked against rotation at splined connection 134 the spherical members 121 and 123 are in locked relation. Preferably the splined connections of parts 140 and 141 on shafts 108 and 109 are also formed to engage in one position only.

The shafts 114 and 115 within which are nested the shafts 108 and 109 are coupled together for the transmission of torque by a coupling of the type comprising short internally and externally toothed parts, said coupling also forming a part of the coupling assembly generally indicated by the reference numeral 111. As shown in Figure 3 an externally toothed part 150 is splined, at 151, to the shaft 114 and is held thereon by a retaining ring 152. The internally toothed part 153 is splined at 154 to the shaft 115 and is retained thereon by ring 155. It will be observed from Figure 7 that shaft 109 adjacent the coupling assembly 111 is supported from part 153 by the bearing 156, the part 153 being itself supported by the bearing 117.

Separation of the coupling members 150 and 153 is prevented by a sleeve 157 which overlaps the two members and has at its forward end an inwardly extending continuous flange 158 which abuts a shoulder 159 on the member 150 so that it cannot be drawn off rearwardly. At the rear end the sleeve 157 has a castellated internal flange 160, the forward end faces of the castellations being arranged to abut corresponding faces of a castellated flange 161 formed around the outside of the internally toothed member 153 when the coupling is locked, and to pass between the opposed castellations when the sleeve 157 is turned through half the pitch of the castellations and the coupling members 150, 153 are moved apart. For holding the sleeve 157 in the locked position it is provided with a radial hole 162 in line with a hole in the member 150, a pin 163 being housed in said holes and pressed outwardly by a coil spring 164 arranged on an inner part of the pin which is of reduced diameter and passes through a correspondingly smaller diameter extension of the hole in the member 150. A head 165 on the pin limits its outward movement and its inward movement against the spring pressure is sufficient to take it clear of the sleeve 157 so that the latter can be rotated.

The double coupling assembly 111 is contained in a chamber 170 defined on the forward side by a diaphragm 171 supporting the bearing 113 (Figure 2), on the rear side by a diaphragm 172 supporting the bearing 117, and peripherally by a cylindrical sheet metal member 173 arranged to prevent lubricating oil flung off from the rotating parts impinging upon the hot wall of the forward part of the combustion chamber 103, where it would be carbonised and produce smoke. Similar provision is made to retain lubricating oil mist around turbine shaft 109 consisting of a frusto-conical sheet metal splash guard 174 attached at its large end to the diaphragm 172 and having sliding engagement with the housing 175 of the bearing 116 (Figure 5), the sliding joint preferably including piston rings 176 or similar sealing members.

The diaphragm 172 is bolted at 177 to a structural member 178 comprising the compressor diffuser casing and forward part of the combustion chamber, and the design provides for access to these bolts after removal of certain combustion chamber parts so that the engine can be divided at this point. Thus, as shown in Figure 7 the outer wall 179 is removed by uncoupling the bolts 180 and withdrawing the wall axially of the engine in the rearward direction. Thereafter the outer and inner parts 181 and 182 respectively of the flame tubes lying within the combustion chamber 103 are dismantled. Finally, the bolts 183 are removed whereby the sheet metal fairing 184 may be taken off to allow access to the bolts 177. Before separation can take place of the two parts of the engine when the bolts 177 have been removed, it is necessary to release the several coupling parts comprising the coupling assembly 111. To enable the outer coupling comprising parts 150 and 153 to be released a tube 185 is provided extending through the diffuser casing and the cylindrical splash guard 173 in the radial plane of the locking pin 163. By inserting a rod-like tool through this tube after removing a sealing cap on the outer end of the tube, and rotating the shafts 114, 115 into the appropriate position, the locking pin 163 may be depressed by the tool so that further rotation of the shafts brings the sleeve 157 into the axially releasable setting in relation to the flange 161, such setting being preferably defined by suitable stop members. After the inner coupling comprising the members 121, 123 has been released in the manner described above, the turbine section of the engine comprising the rotors 104, 105, shafts 109, 115, diaphragm 172 and splash guard 174 and the members 123, 131, 141 and 153 of the coupling assembly 111 may be withdrawn rearwardly.

Figure 6 illustrates a modification of the parts 157, 158, 159 described more particularly with reference to Figure 3 of the drawings. The parts of the modification shown in Figure 6 which are also present in the coupling shown in Figure 3 bear like reference numerals and it will be observed that in the modification the sleeve 150 is outwardly flanged at 190 to form a shoulder against which abuts ring 191 having a part spherical surface which is engaged by a correspondingly formed surface on the inwardly extending continuous flange 158. The spherical surfaces provide thrust surfaces for the outer coupling comprising the members 150 and 153. The generating centre of the spherical thrust surfaces on flange 158 and ring 191 is at or near the centre of curvature of the spherical surfaces of the members 121 and 123. Since the relative movements between the parts 158 and 191 are very slight, the location of the centre is not of extreme importance but it is preferred to displace it a short distance to the rear of the centre of curvature of the members 121, 123 since the surface pressures between the parts 158, 191 are thereby reduced.

We claim:
1. A coupling between four shafts arranged in pairs, an inner shaft contained within an outer shaft for each pair, and subject to slight misalignment, one at least of said inner shafts being hollow, comprising internally and externally toothed parts on the two inner shafts respectively and in rotational driving engagement with one another while permitting slight angular misalignment, one of the adjacent inner shaft ends carrying a part-spherical surface mating in overlapping relation with a complementary part-spherical surface on a member attached to the other adjacent inner shaft end in a manner permitting rotation but not axial withdrawal in relation thereto, the parts carrying the mating surfaces being cut away sufficiently to allow these surfaces to be brought together axially and then locked against withdrawal by partial rotation of the rotatable member, means extending through the hollow shaft for effecting such partial rotation and for locking the rotatable member against undesired rotation relatively to the shafts and internally and externally toothed parts fixed or formed on the outer hollow shafts respectively and in rotational driving engagement with one another while permitting slight angular misalignment.

2. A coupling as claimed in claim 1 wherein means are provided carried by said outer shafts for preventing axial separation of the toothed parts of the outer shafts.

3. A coupling as claimed in claim 2 wherein said means comprises a sleeve rotatably mounted on one of said parts and overlapping the second part of said sleeve abutting a shoulder on the first part to prevent movement of said sleeve towards said second part, projections on said sleeve and second part to prevent their separation when the sleeve is in a certain angular relation thereto and to permit such separation when in another angular relation thereto, and releasable means for locking the sleeve in said first angular relation.

4. A coupling as claimed in claim 3 wherein the releasable means comprises a locking member carried by one of the toothed parts and urged outwardly by a spring into a hole through the sleeve.

5. A coupling as claimed in claim 4 wherein said locking member comprises a radially movable pin or the like.

6. In a gas turbine engine comprising an axial sequence of a low pressure compressor, a high pressure compressor, a high pressure turbine, and a low pressure turbine; a first pair of concentric shafts, of which the outer shaft carries said high pressure compressor and the inner shaft carries said low pressure compressor; and a second pair of concentric shafts, of which the outer shaft carries said high pressure turbine and the inner shaft carries said low pressure turbine, at least one of the inner shafts being hollow: a coupling between the inner shafts and the outer shafts, said coupling comprising internally and externally toothed parts on the two inner shafts respectively and in rotational driving engagement with one another, said internally and externally toothed parts permitting slight angular misalignment of the inner shafts, and one of the adjacent inner shaft ends having a part-spherical surface mating in overlapping relation with a complementary part-spherical surface on a member attached to the other adjacent inner shaft end in a manner permitting rotation but not axial withdrawal in relation thereto, the parts carrying the mating surfaces being cut away sufficiently to allow these surfaces to be brought together axially and then locked against withdrawal by partial rotation of the rotatable member, means extending through said hollow shaft for effecting such partial rotation and for locking the rotatable member against undesired rotation relatively to the shafts, and internally and externally toothed parts on the outer shafts respectively and in rotational driving engagement with one another, said internally and externally toothed parts on the outer shafts permitting slight angular misalignment of the outer shafts.

References Cited in the file of this patent

UNITED STATES PATENTS

| Number | Name | Date |
|---|---|---|
| 2,455,879 | Maul et al. | Dec. 7, 1948 |
| 2,525,695 | Lombard | Oct. 10, 1950 |
| 2,529,973 | Sedille et al. | Nov. 14, 1950 |